United States Patent
Lee et al.

(10) Patent No.: US 8,109,480 B2
(45) Date of Patent: Feb. 7, 2012

(54) PLATE HOLDER AND LIQUID CRYSTAL DISPLAY HAVING THE SAME

(75) Inventors: Young Jae Lee, Yongin-Si (KR); Young Rok Oh, Asan-Si (KR)

(73) Assignee: Samsung Electronics Co., Ltd. (KR)

( * ) Notice: Subject to any disclaimer, the term of this patent is extended or adjusted under 35 U.S.C. 154(b) by 702 days.

(21) Appl. No.: 11/780,536

(22) Filed: Jul. 20, 2007

(65) Prior Publication Data

US 2008/0020617 A1 Jan. 24, 2008

(30) Foreign Application Priority Data

Jul. 20, 2006 (KR) .................. 10-2006-0067989

(51) Int. Cl.
- A47F 1/14 (2006.01)
- A47G 1/16 (2006.01)
- A47G 1/10 (2006.01)
- B60R 1/02 (2006.01)
- H05K 5/00 (2006.01)
- H05K 7/00 (2006.01)
- G06F 5/00 (2006.01)

(52) U.S. Cl. ............... 248/220.1; 248/222.12; 248/473; 248/223.31; 248/316.7; 248/316.2; 349/58; 24/456; 24/67 R; 24/67.3; 24/67.11; 24/67 CF; 361/679.01; 361/679.02

(58) Field of Classification Search ............... 248/311.2, 248/917, 346.01, 222.12, 473, 223.31, 224.61, 248/316.7, 220.1, 316.2; 349/58; 24/456, 24/67 R, 67.3, 67.11, 67 CF; 361/679.01, 361/679.02

See application file for complete search history.

(56) References Cited

U.S. PATENT DOCUMENTS

| 5,456,435 | A | * | 10/1995 | Sweeney | 248/250 |
| 6,161,804 | A | * | 12/2000 | Paske et al. | 248/74.1 |
| 6,175,396 | B1 | * | 1/2001 | Kim et al. | 349/58 |
| 6,552,761 | B1 | * | 4/2003 | Seo et al. | 349/58 |
| 6,975,368 | B2 | * | 12/2005 | Lee | 349/58 |
| 7,304,837 | B2 | * | 12/2007 | Lo et al. | 361/679.27 |
| 2001/0052306 | A1 | * | 12/2001 | Kunert et al. | 106/1.13 |
| 2004/0252254 | A1 | * | 12/2004 | Koo et al. | 349/58 |
| 2009/0180049 | A1 | * | 7/2009 | Lee et al. | 349/58 |

FOREIGN PATENT DOCUMENTS

| CN | 1567059 A | 1/2005 |
| CN | 1639619 A | 7/2005 |

OTHER PUBLICATIONS

State Intellectual Property Office of People's Republic of China; The First Office Action; Nov. 13, 2009; 200710305182.3—English Translation.
State Intellectual Property Office of People's Republic of China; The First Office Action; Nov. 13, 2009; 200710305182.3—Non-English.

* cited by examiner

Primary Examiner — Terrell McKinnon
Assistant Examiner — Christopher Garft
(74) Attorney, Agent, or Firm — Cantor Colburn LLP

(57) ABSTRACT

The present invention relates to a plate holder and a liquid crystal display having the same. There is provided a plate holder for fixing a plate in a liquid crystal display. The plate holder includes a base portion, a body portion formed on an end of the base portion and laterally extending therefrom, and a head portion formed at a distal end of the body portion. The body portion includes a first body portion and a second body portion disposed to be spaced apart by a predetermined interval from and to face the first body portion.

6 Claims, 9 Drawing Sheets

PLATE HOLDER AND LIQUID CRYSTAL DISPLAY HAVING THE SAME

This application claims priority to Korean Patent application No. 2006-0067989 filed on Jul. 20, 2006, and all the benefits accruing therefrom under 35 U.S.C. §119, the contents of which are herein incorporated by reference in its entirety.

BACKGROUND OF THE INVENTION

1. Field of Invention

The present invention relates to a plate holder and a liquid crystal display having the same, and more particularly, to a heat insulation plate holder for preventing a heat insulation plate from being bent and moved, and a liquid crystal display having the same.

2. Description of the Prior Art

Since a flat panel display, such as a liquid crystal display, has merits of a small size, a light weight and a large screen, compared with a conventional cathode ray tube ("CRT"), the flat panel display is used for various applications such as a monitor, a laptop computer and a television ("TV"). The flat panel display is also used for a public information display ("PID") as a substitution for a conventional signboard.

However, in a design of such a PID module, there is a problem about heat generated due to high luminance as the number of lamps is increased. To this end, a heat insulation plate is additionally disposed between a liquid crystal display panel and the lamps to insulate the heat.

In the meantime, a hook has been used to fix the heat insulation plate used in the PID module. The hook may prevent the heat insulation plate from being moved in X, Y and Z directions, so that it is possible to solve the problems that the heat insulation plate is moved and escapes from its proper position. The heat insulation plate may have a relatively large thermal expansion coefficient such that the heat insulation plate does not sufficiently expand in the X and Y directions (e.g., horizontal directions) and is bent in the Z direction (e.g., a vertical direction) when the heat insulation plate is subjected to the heat from the lamps. As a result, this may cause image deterioration. In addition, since the heat insulation plate is assembled in a press fit manner in such a configuration for fixing the heat insulation plate, there is a concern that the assembly of the heat insulation plate is difficult and foreign materials are easily generated when the heat insulation plate is assembled.

BRIEF SUMMARY OF THE INVENTION

An exemplary embodiment provides a heat insulation plate holder preventing a heat insulation plate from being bent and moved and a liquid crystal display having the same.

In an exemplary embodiment, there is provided a plate holder for fixing a plate in a liquid crystal display. The plate holder includes a base portion; a body portion formed on an end of the base portion to laterally extend therefrom and a head portion formed at an end of the body portion.

In an exemplary embodiment, the plate may be a heat insulation plate.

In an exemplary embodiment, a groove of a predetermined shape may be formed in the base portion so that upper and lower surfaces of the base portion facing each other are spaced apart from each other by a predetermined interval.

In an exemplary embodiment, the body portion may include a first body portion and a second body portion disposed to be spaced apart by a predetermined interval from and to face the first body portion. The head portion may include a first head portion formed on an end of one of the first and second body portion.

In an exemplary embodiment, the head portion further includes a second head portion formed on an end of the other of the first and second body portion.

In an exemplary embodiment, a thickness of the head portion is gradually reduced in a direction towards the distal end.

In an exemplary embodiment, the first and second body portions are formed on the end of the base portion such that facing surfaces of the first and second body portions are disposed in parallel with an extending direction of a lower surface of the base portion.

In an exemplary embodiment, the first and second body portions are formed on the end of the base portion such that facing surfaces of the first and second body portions are disposed perpendicular to an extending direction of a lower surface of the base portion.

In an exemplary embodiment, a thickness of the head portion which is not formed with the first head portion is gradually reduced in a direction towards the distal end.

In an exemplary embodiment, the head portion extends from one end of the first and second body portions and connects the first and second body portions.

In an exemplary embodiment, a concave portion is formed in a central region of the head portion and divides the head portion into two parts spaced apart from each other by a predetermined interval. A thickness of the head portion is gradually reduced in a direction towards the distal end.

In an exemplary embodiment, there is provided a liquid crystal display including a liquid crystal display panel displaying images, a receiving container having a receiving space defined therein, a lamp providing light to the liquid crystal display panel, a heat insulation plate disposed in the receiving space of the receiving container and insulating heat generated from the lamp and a plurality of heat insulation plate holders. Each of the heat insulation plate holders includes a first end fixed to the receiving container and a second end disposed on an upper surface of the heat insulation plate and fixing the heat insulation plate. Each of the heat insulation plate holders includes a base portion, a body portion formed on an end of the base portion and laterally extending therefrom, and a head portion formed at a distal end of the body portion In an exemplary embodiment, a sidewall of the receiving container includes a plurality of holes and the head portion of the heat insulation plate holder penetrates the hole and is fastened thereto.

In an exemplary embodiment the liquid crystal display may further include a plurality of optical sheets disposed on the heat insulation plate, and a lower receiving container disposed under the receiving container and fastened to the receiving container.

In an exemplary embodiment, each of the heat insulation plate holders may be formed of a plastic material.

In an exemplary embodiment, a surface of the base portion of the heat insulation plate holder may be disposed on the upper surface of the heat insulation plate and preventing the heat insulation plate from being moved up and down.

In an exemplary embodiment, the base portion, body portion and head portion of the heat insulation plate holder may be integrally formed.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Figure 1:
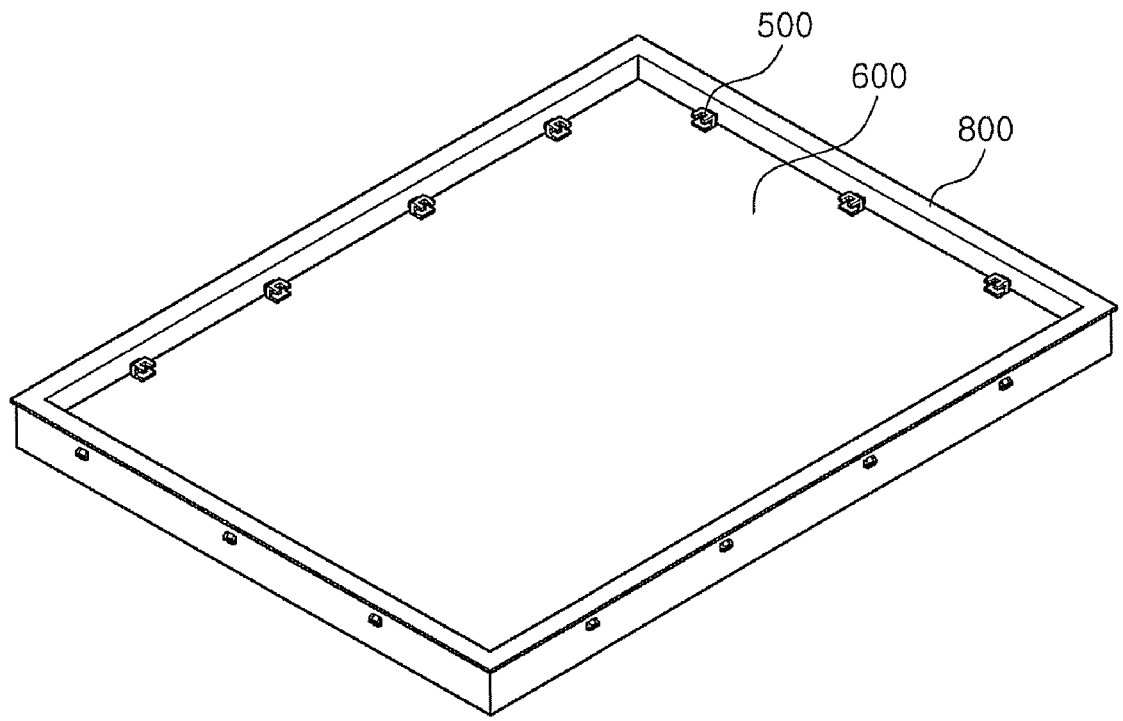
FIG. 1 is a perspective view showing an exemplary embodiment of a heat insulation plate holder fastened to a mold frame according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a preferred embodiment of a heat insulation plate holder according to the present invention will be described in detail with reference to the accompanying drawings. Throughout the drawings, like reference numerals are used to designate like elements.

FIG. 1 is a perspective view showing an exemplary embodiment of a heat insulation plate holder fastened to a mold frame according to the present invention.

Referring to FIG. 1, a heat insulation plate 600 is disposed in a receiving space of a mold frame 800. A plurality of heat insulation plate holders 500 for fixing the heat insulation plate 600 are disposed along sidewalls of the mold frame 800.

An end (or side) of each heat insulation plate holder 500 is fastened and fixed to a sidewall of the mold frame 800 and another end (or side) of the heat insulation plate holder 500 is disposed on an upper surface of the heat insulation plate 600, thereby reducing or effectively preventing the heat insulation plate 600 from being moved up and down.

In an exemplary embodiment, the heat insulation plate 600 may be formed to be smaller than the receiving space of the mold frame 800 such that a predetermined gap (not shown) is provided between a side of the heat insulation plate 600 and the side wall of the mold frame 800. This relatively smaller dimensioned heat insulation plate 600 and the gap allow for a size change of the heat insulation plate 600 when the heat insulation plate 600 expands due to heat generated from lamps (not shown). Movement up and down of the heat insulation plate 600 is reduced or effectively prevented and movement from side to side is reduced or effectively prevented using the heat insulation plate holder 500 attached to the sidewalls of the mold frame 800 and an disposed on the upper surface of the heat insulation plate 600 as described above. Advantageously, bending of the heat insulation plate 600 is reduced or effectively prevented in a certain direction (e.g., vertical direction) although the heat insulation plate 600 expands by the heat. Now, the configuration of the heat insulation plate holder 500 will be described in more detail.

Figure 2A:
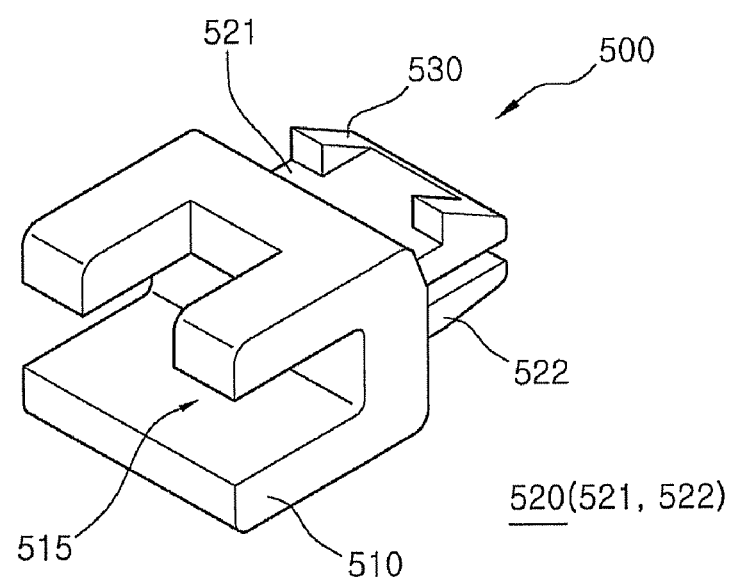
FIG. 2A is a perspective view of an exemplary embodiment of a heat insulation plate holder according to the present invention.
Figure 2B:
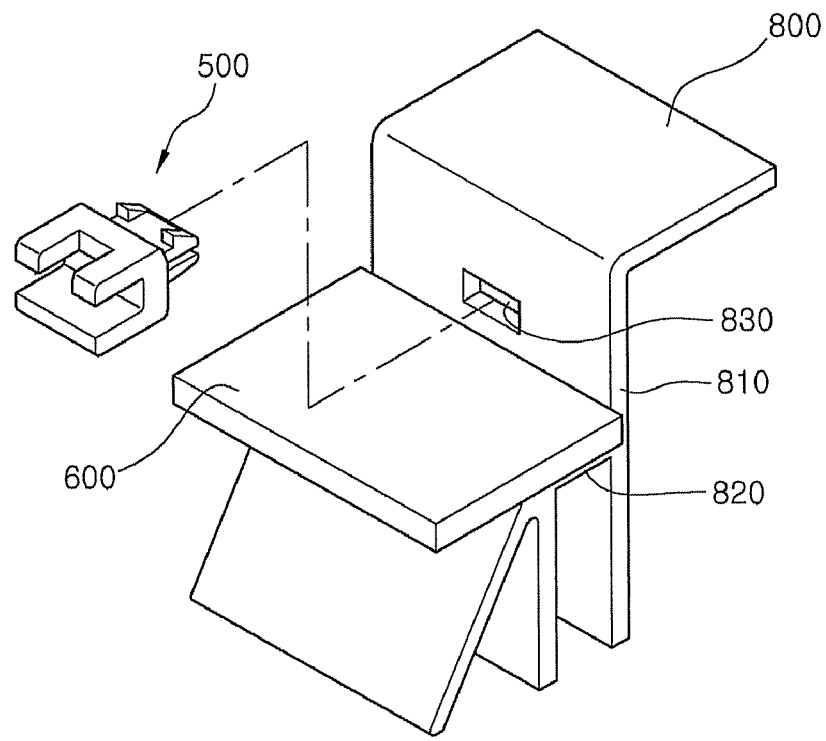
FIG. 2B is a view showing the heat insulation plate holder of FIG. 2A before it is fastened to the mold frame.

FIG. 2A is a perspective view of an exemplary embodiment of a heat insulation plate holder according to a first embodiment of the present invention and FIG. 2B is a view showing the heat insulation plate holder of FIG. 2A before it is fastened to the mold frame.

As shown in FIGS. 2A and 2B, the heat insulation plate holder 500 includes a base portion 510, a body portion 520 and a head portion 530.

The base portion 510 is formed in a substantially regular or rectangular hexahedral shape. The base portion 510 has a groove 515 formed therein so that upper and lower surfaces of the base portion 510 facing each other are spaced apart from each other by a predetermined interval. An upper portion of the base portion 510 formed by the groove 515 may also include a notch or opening in the upper portion. The base portion 510 may be considered to form a substantially "C" shape by the groove 515 in a cross-sectional view (e.g., vertical direction). The Base portion 510 is in contact with the heat insulation plate 600 and serves to fix the heat insulation plate 600 such that movement of the heat insulation plate 600 in the Z direction, e.g., up and down, is reduced or effectively prevented.

In an exemplary embodiment, a contact area of the base portion 510 and the heat insulation plate 600, e.g., an overlapping area, is sufficiently large such that it is possible to provide a sufficient gap between the heat insulation plate 600 and the sidewall of the mold frame 800. Accordingly, the heat insulation plate can be prevented from being bent in a vertical direction even though the heat insulation plate expands by the heat in a horizontal direction (e.g., into the gap). Since a surface area of the base portion 510 is increased if the upper and lower surfaces of the base portion 510 are spaced apart from each other by a predetermined interval (e.g., such as by the groove 515), the heat conducted from the heat insulation plate 600 can be more easily discharged. However, the shape of the base portion 510 is not limited thereto and may be variously changed.

Referring to FIG. 2A, the body portion 520 is formed on an end of the base portion 510 to laterally (e.g., horizontally) extend from the base portion 510. The head portion 530 is formed at an end of the body portion 520. The first and second ends are substantially perpendicular to each other. The body portion 520 includes a first body portion 521 and a second body portion 522. The second body portion 522 is disposed to be spaced apart by a predetermined interval from and to face the first body portion 521, the body portion 520 thereby having predetermined elasticity. The first and second body portions 521 and 522 are disposed and formed such that their facing surfaces are substantially in parallel with the heat insulation plate 600 and extend substantially perpendicular to the side of the base portion 510. In an exemplary embodiment, the thickness of the second body portion 522 may be gradually reduced as it goes to its distal end as illustrated in FIG. 2A.

The head portion 530 is formed at an end of an outer surface of the first body portion 521, e.g., a distal end of a surface opposite to an inner surface of the first body portion 521 that faces the second body portion 522. One end of the head portion 530 is formed to be relatively thicker. A thickness of the head portion 530 is gradually reduced as it goes from the one end to the other end (toward the distal end of the body portion 521). The head portion 530 may be formed in a substantially triangle shape. As illustrated in FIGS. 2A and 2B, the head portion 530 is formed in the end of the outer surface of the first body portion 521, but the head portion 530 is not limited thereto and may be formed at the end of the outer surface of the second body portion 522.

In an alternative exemplary embodiment, the head portion 530 may be formed at both distal ends of the outer surfaces of the body portion 520 (e.g., first and second body portions 521 and 522), or partially formed as shown in FIGS. 3A to 3D. The head portion 530 may include two substantially triangular shapes with a space in between as illustrated in FIG. 2A or the head portion 530 may extend in a single triangular shape extended across the end of the body portion 520 in a direction substantially perpendicular to the extension of the first and second body portions 521 and 522.

In exemplary embodiments, the base portion 510, the body portion 520 and/or the head portion 530 of the heat insulation plate holder 500 may be integrally formed. As used herein, the term "integrally" is used to indicate formed to be a single unit or piece rather than combining separate elements. The heat insulation plate holder 500 may be formed of a plastic material. However, the material of the heat insulation plate holder 500 is not limited thereto and a variety of materials having predetermined elasticity may be used.

In FIG. 2B, the aforementioned heat insulation plate holder 500 and mold frame 800 which are fastened to each other are schematically illustrated.

The mold frame 800 is formed substantially in a square frame shape with a center region opened, thereby defining the receiving space therein. A liquid crystal display panel (not shown), a plurality of optical sheets (not shown) and the heat insulation plate are accommodated in the receiving space. The mold frame 800 includes a plurality of sidewalls 810 and a storage surface 820 extending in a substantially horizontal direction (e.g., parallel to the heat insulating plate 600) to the inner receiving space from the sidewalls 810. Here, the sidewalls 810 are formed with holes 830 to which the heat insulation plate holders 500 are fastened. The heat insulation plate 600 for insulating the heat generated from the lamp (not shown) is seated on an upper surface of the storage surface 820.

Figure 3A:
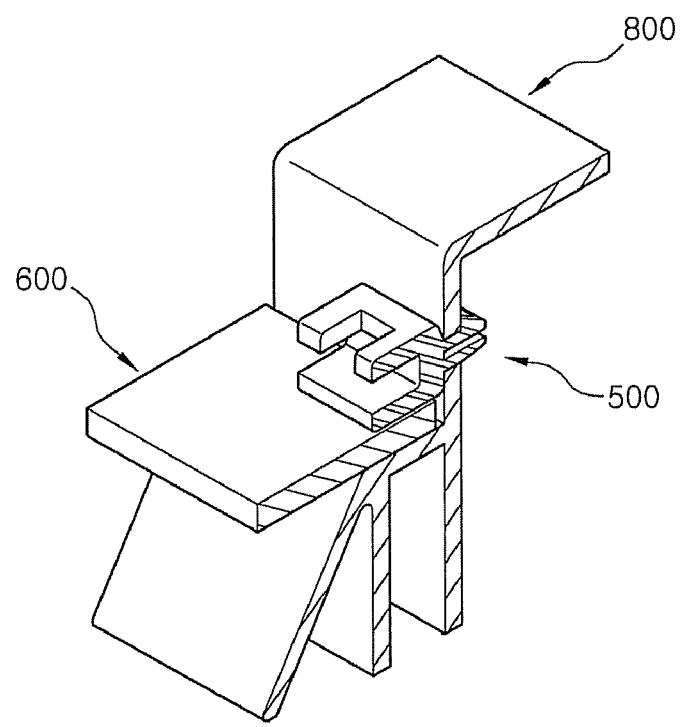
FIGS. 3A and 3B are perspective and cross sectional views, respectively, showing an exemplary embodiment of the heat insulation plate holder of FIG. 2A fastened to the mold frame according to the present invention.
Figure 3B:
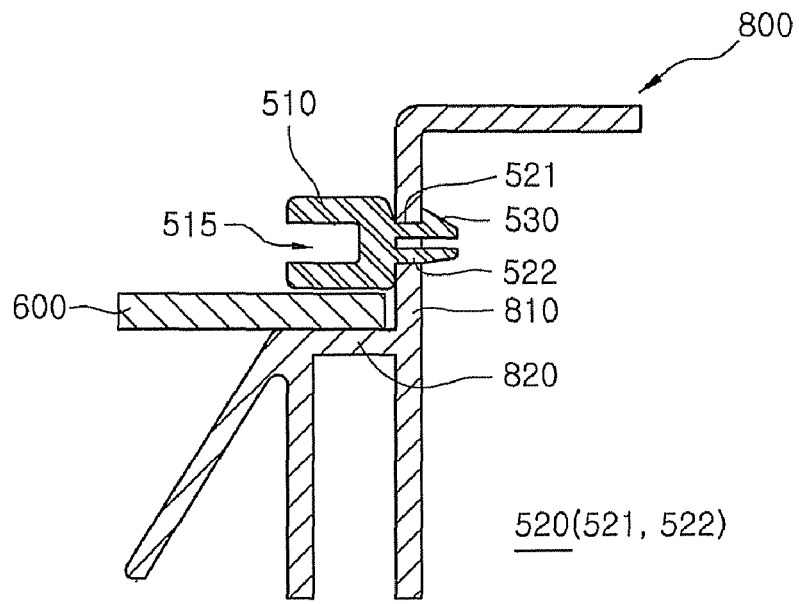
Figure 3C:
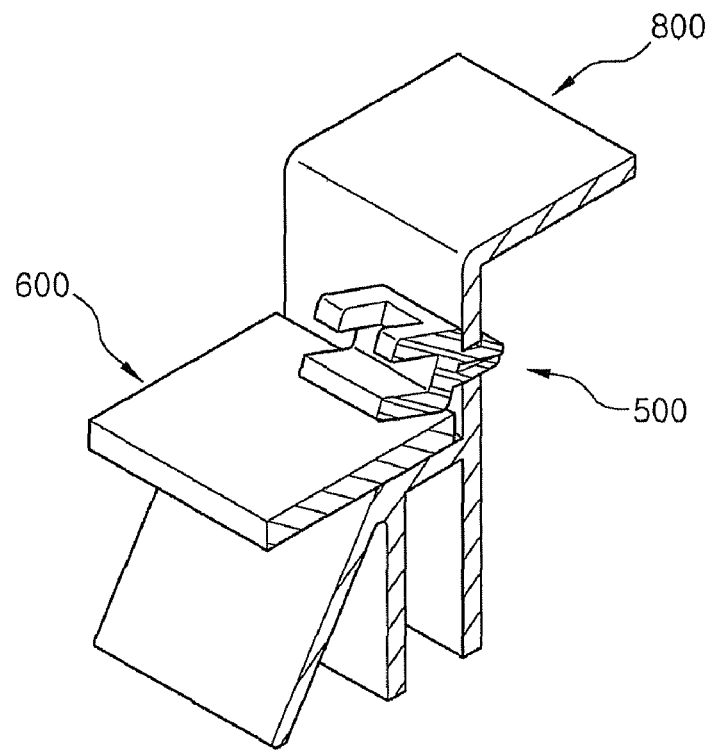
FIGS. 3C and 3D are perspective and cross sectional views, respectively, showing an exemplary embodiment of the heat insulation plate holder of FIG. 2A separated from the mold frame according to the present invention.
Figure 3D:
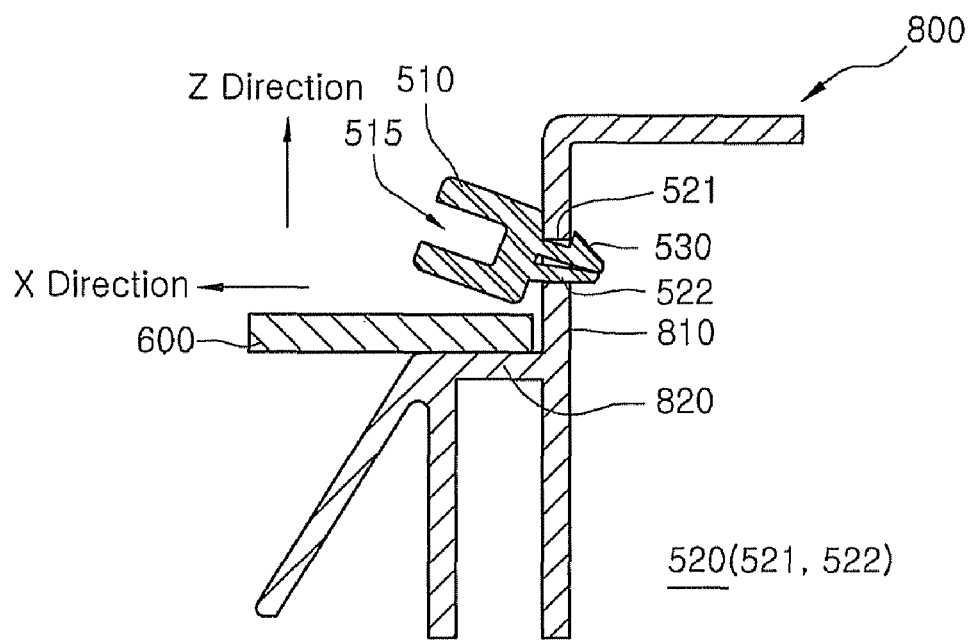

FIGS. 3A and 3B are perspective and cross sectional views, respectively, showing a the heat insulation plate holder of FIG. 2A fastened to the mold frame according to the present invention and FIGS. 3C and 3D are perspective and cross sectional views, respectively, showing a heat insulation plate holder of FIG. 2A separated from the mold frame according to the present invention.

As shown in FIGS. 3A and 3B, the heat insulation plate 600 is seated on the storage surface 820 of the mold frame 800. The heat insulation plate holder 500 is fastened and coupled to the hole 830 formed in the sidewall 810 of the mold frame 800. A lower surface of the base portion 510 of the heat insulation plate holder 500 is placed on an upper surface of the heat insulation plate 600, thereby reducing or effectively preventing the heat insulation plate 600 from being moved up and down due to an external shock or vibration. The body portion 520 and head portion 530 are fastened to the hole 830 formed in the sidewall of the mold frame 800, so that the heat insulation plate holder 500 is fixed to the mold frame 800. The first and second body portions 521 and 522 and protrude through the hole 830 from the receiving space of the mold frame 800 towards an outside of the mold frame 800.

An exemplary embodiment of a process of assembling the heat insulation plate holder 500 to the hole 830 of the mold frame 800 will now be described. When the head portion 530 and body portion 520 of the heat insulation plate holder 500 are inserted to the hole 830, a gap between the first and second body portions 521 and 522 becomes narrow, so that the head portion 530 and body portion 520 are easily inserted to the hole 830. When the head portion 530 completely penetrates the hole 830 (as illustrated in FIGS. 3A and 3B), the gap between the first and second body portions 521 and 522 is restored to its original state, so that the end of the head portion 530 is caught to the hole 830. Accordingly, the heat insulation plate holder 500 is firmly fastened to the mold frame 800.

Referring to FIGS. 3C and 3D, an exemplary embodiment of a process of separating the heat insulation plate holder 500 from the hole 830 of the mold frame 800 will now be described. There are instances where the heat insulation plate holder 500 is separated from the hole 830 in order to replace the heat insulation plate 600 or to replace other constitutional elements. If the base portion 510 of the heat insulation plate holder 500 is lifted up in the Z direction, e.g., upward and the base portion 510 is pulled in the X direction, e.g., in a direction toward the inside of the mold frame 800, the heat insulation plate holder 500 may be easily separated. When the base portion 510 is lifted up, the gap between the first and second body portions 521 and 522 becomes narrow and the head portion 530 can pass through the hole 830. When the base portion 510 is pulled in such a manner, the body and head portions 520 and 530 pass through the hole 830 and are separated from the mold frame 800.

Figure 4A:
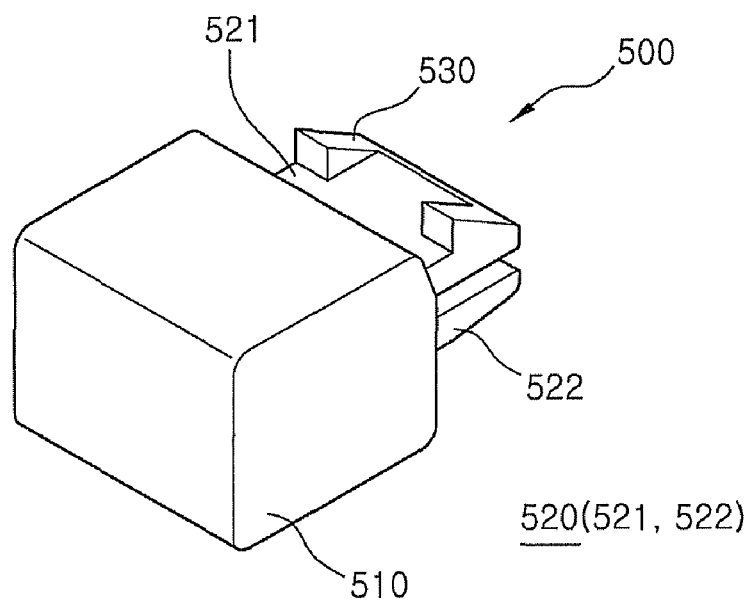
FIG. 4A is a perspective view of another exemplary embodiment of a heat insulation plate holder according to the present invention.
Figure 4B:
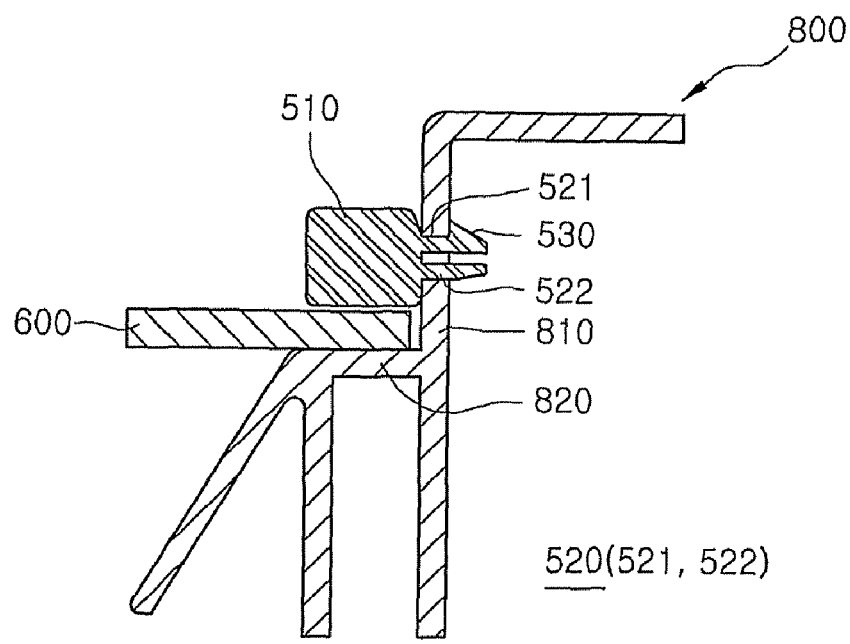
FIG. 4B is a cross sectional view showing an exemplary embodiment of the heat insulation plate holder of FIG. 4A fastened to the mold frame according to the present invention.

FIG. 4A is a perspective view of another exemplary embodiment of a heat insulation plate holder according to the present invention and FIG. 4B is a cross sectional view showing an exemplary embodiment of where the heat insulation plate holder according to FIG. 4A is fastened to the mold frame. The embodiment shown in FIGS. 4A and 4B is different from that of FIGS. 2A and 2B in terms of the configuration of the base portion 510 of the heat insulation plate holder 500. The base portion 510 of the heat insulation plate holder 500 in FIGS. 4A and 4B is generally formed in a regular or rectangular hexahedral shape without having a groove formed therein. Since the other configurations of the heat insulation plate holder are the same, the detailed descriptions thereof will be omitted.

Figure 5A:
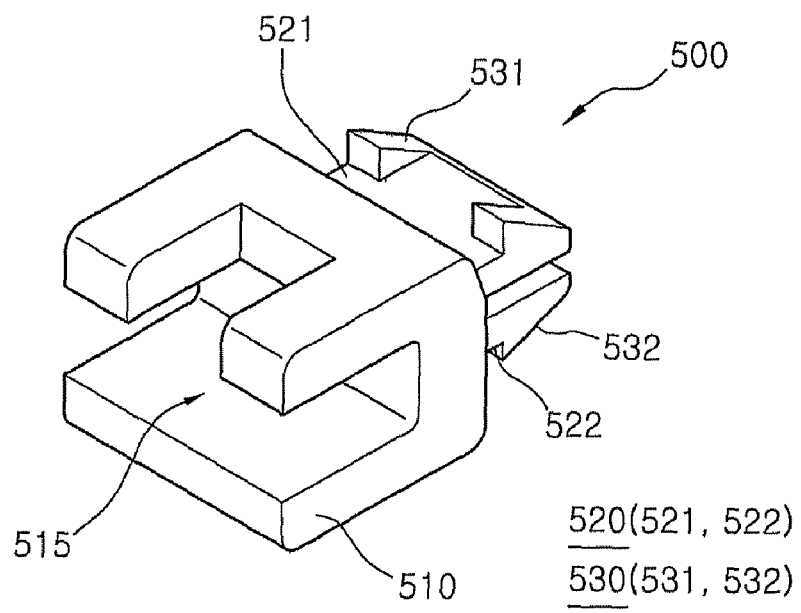
FIG. 5A is a perspective view of another exemplary embodiment of a heat insulation plate holder according to the present invention.
Figure 5B:
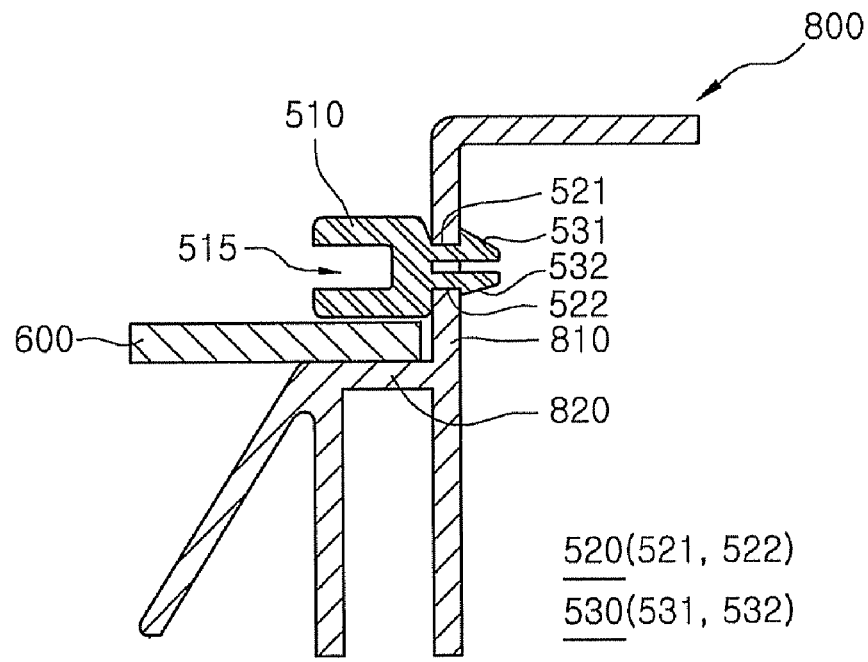
FIG. 5B is a cross sectional view showing an exemplary embodiment of the heat insulation plate holder of FIG. 5A fastened to the mold frame according to the present invention.

FIG. 5A is a perspective view of another exemplary embodiment of a heat insulation plate holder according to the present invention and FIG. 5B is a cross sectional view showing an exemplary embodiment of the heat insulation plate holder fastened to the mold frame according to the present invention. The embodiment shown in FIGS. 5A and 5B is somewhat different from the previous embodiments in terms of the configuration of the head portion of the heat insulation plate holder, and the other features thereof are similar therewith. Therefore, the following description will be focused on such differences.

A heat insulation plate holder 500 as illustrated in FIGS. 5A and 5B includes a base portion 510, a body portion 520 and a head portion 530.

The body portion 520 includes a first body portion 521 and a second body portion 522 disposed to be spaced apart by a predetermined interval from and to face the first body portion 521. The head portion 530 includes a first head portion 531 and a second head portion 532. The first head portion 531 is formed on an end (e.g., distal end) of the outer surface of the first body portion 521 and the second head portion 532 is formed on an end (e.g., distal end) of the outer surface of the second body portion 522. One end of each of the first and second head portions 531 and 532 is formed to be relatively thicker. A thickness of each of the first and second head portions 531 and 532 is gradually reduced as it goes from the one end to the other end (toward the distal end of the body portions 521 and 522). The first head portion 531 and/or the second head portion 532 may be formed in substantially a triangle shape.

As illustrated in FIGS. 5A and 5B, the first head portion 531 is formed to have a size (e.g., cross-sectional area of the "triangle shape") relatively larger than the second head portion 532, but it is not limited thereto. In an alternative exemplary embodiment, the second head portion 532 may have a size lager than the first head portion 531, or the sizes of the first and second head portions 531 and 532 may be the same. The base portion 510 of the heat insulation plate holder 500 in FIGS. 5A and 5B may further be formed in a regular or rectangular hexahedral shape without having a groove formed therein.

In exemplary embodiments, when the second head portion is additionally formed, the heat insulation plate holder 500 may be more tightly fastened to the mold frame. Advantageously, movement of the heat insulation plate up and down can be securely reduced or effectively prevented.

Figure 6A:
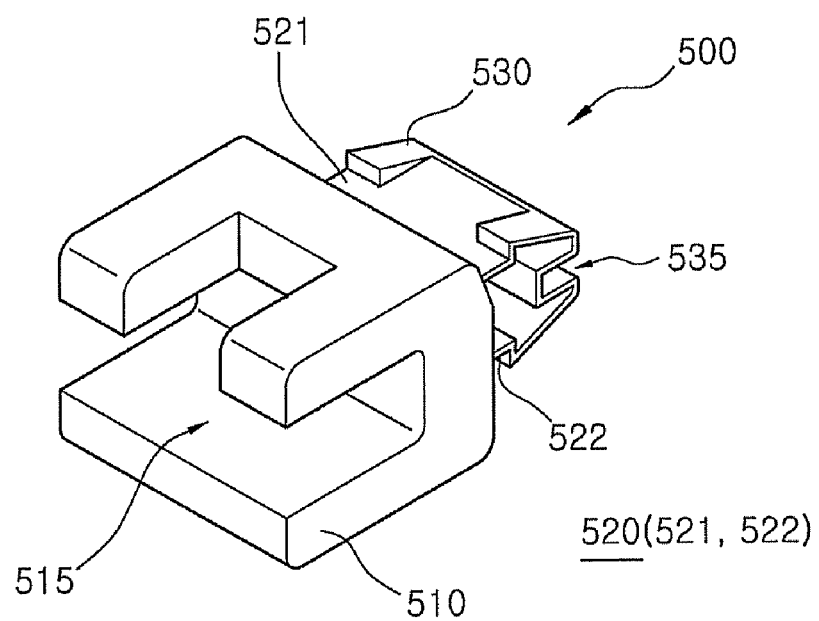
FIG. 6A is a perspective view of another exemplary embodiment of a heat insulation plate holder according to the present invention.
Figure 6B:
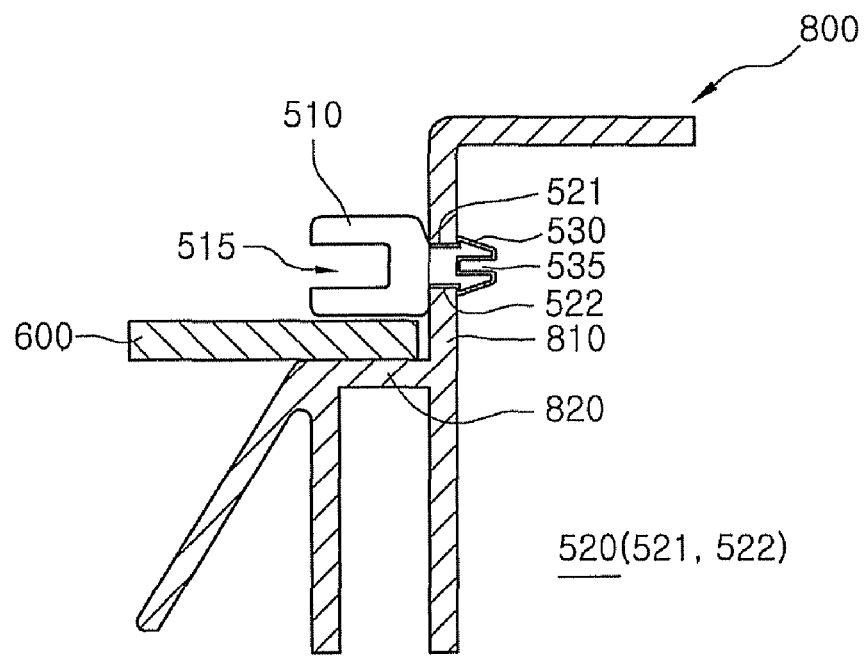
FIG. 6B is a cross sectional view showing an exemplary embodiment of the heat insulation plate holder of FIG. 6A fastened to the mold frame according to the present invention.

FIG. 6A is a perspective view of another a heat insulation plate holder according to the present invention and FIG. 6B is a cross sectional view showing an exemplary embodiment of the heat insulation plate holder fastened to the mold frame according to the present invention. The embodiment shown in FIGS. 6A and 6B is somewhat different from the previous embodiments in terms of the configuration of the head portion of the heat insulation plate holder, and the other features thereof are nearly similar therewith. Therefore, the following description will be focused on such differences.

A heat insulation plate holder 500 of FIGS. 6A and 6B includes a base portion 510, a body portion 520 and a head portion 530.

The head portion 530 is formed at ends of first and second body portions 521 and 522 such that the first and second body portions 521 and 522 are connected to each other. The first body portion 521, the head portion 530 and the second body portion 522 are formed in a closed polygonal shape.

A first end of the head portion 530 is formed to be thicker than the body portion 520 in a substantially vertical (e.g., perpendicular direction to the heat insulating plate 600) A thickness of the head portion 530 is gradually reduced as it goes from the first end to a second end (e.g., distal end of the body portion 520). The head portion 520 and the body portion 520 may be considered as forming an arrowhead. A central region of the head portion 530 at the second end may be indented to define a concave portion 535 dividing the head portion 530 into two parts that are spaced apart from each other by a predetermined interval, whereby the head portion 530 has predetermined elasticity.

The head portion 530 may be formed to have sizes (e.g., cross-sectional area of the "triangle shape") corresponding to the first and second body portions 521 and 522 be approximately the same. In alternative embodiments, one side of the head portion 530 may be relatively larger than the opposite side. In an alternative exemplary embodiment, the second head portion 532 may have a size lager than the first head portion 531. The base portion 510 of the heat insulation plate holder 500 in FIGS. 6A and 6B may further be formed in a regular or rectangular hexahedral shape without having a groove formed therein.

Figure 7A:
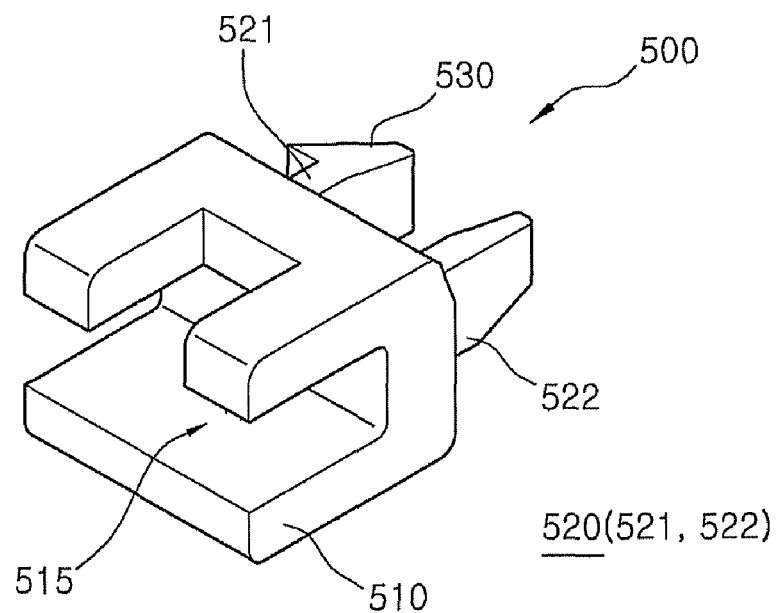
FIG. 7A is a perspective view of another exemplary embodiment of a heat insulation plate holder according to the present invention.
Figure 7B:
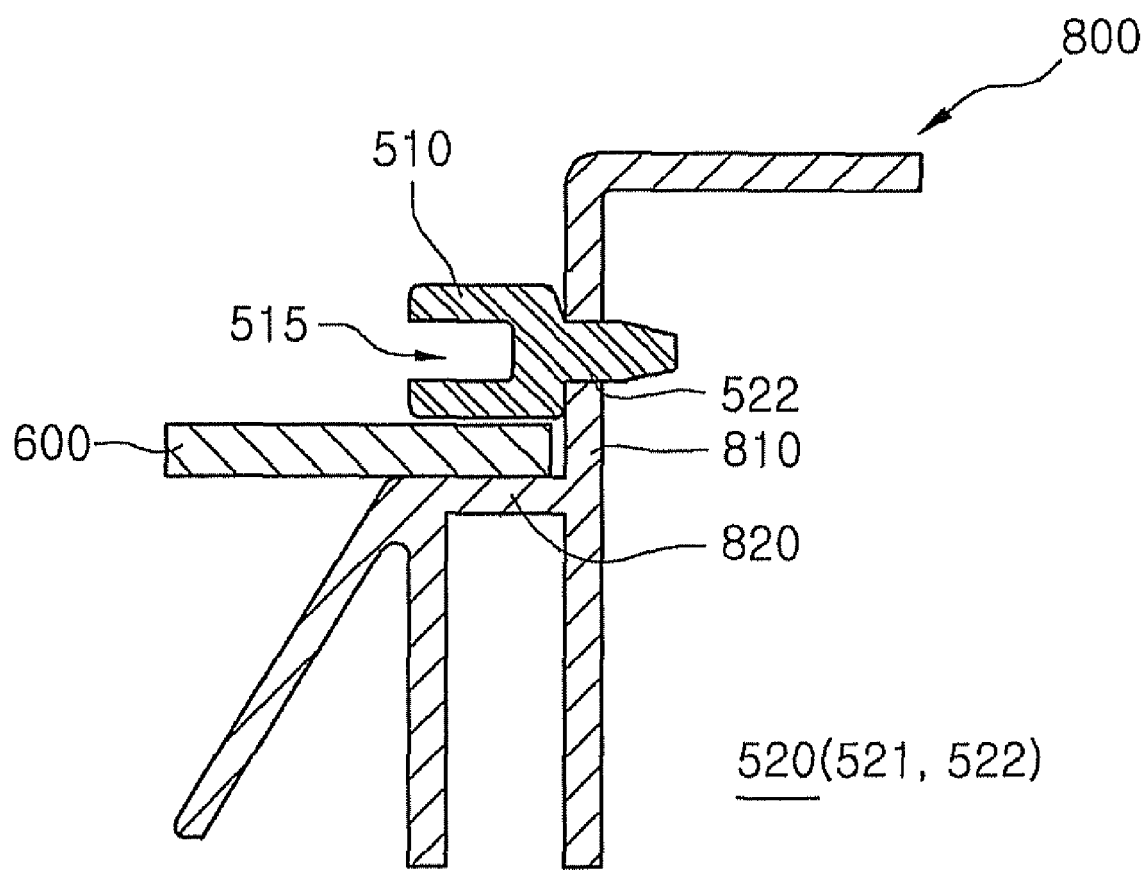
FIG. 7B is a cross sectional view showing an exemplary embodiment of the heat insulation plate holder of FIG. 7A fastened to the mold frame according to the present invention.

FIG. 7A is a perspective view of another exemplary embodiment of a heat insulation plate holder according to the present invention and FIG. 7B is a cross sectional view showing an exemplary embodiment of the heat insulation plate holder of FIG. 7A fastened to the mold frame according to the present invention.

The embodiment shown in FIGS. 7A and 7B is somewhat different from that of FIGS. 2A and 2B in terms of the configuration of the body portion of the heat insulation plate holder, and the other configurations thereof are nearly similar therewith. Therefore, the following description will be focused on such differences.

A heat insulation plate holder 500 of FIGS. 7A and 7B includes a base portion 510, a body portion 520 and a head portion 530. The body portion 520 is formed on an end of the base portion 510 to laterally extend therefrom, and the head portion 530 is formed at one end of the body portion 520. The body portion 520 includes a first body portion 521 and a second body portion 522 disposed to be spaced apart by a predetermined interval from and to face the first body portion 521, thereby having predetermined elasticity. The first and second body portions 521 and 522 are disposed and formed such that their facing surfaces cross (e.g., are perpendicular to) the heat insulation plate 600. In an exemplary embodiment, the base portion 510 of the heat insulation plate holder 500 in FIGS. 76A and 7B may further be formed in a regular or rectangular hexahedral shape without having a groove formed therein.

If the base portion 510 is pulled in the inner direction (e.g., in the X direction) of the mold frame 800 in a state where a force is exerted to the base portion 510 of the heat insulation plate holder 500 towards the first body portion 521 and/or the second body portion 522 (e.g., in the Y direction), the heat insulation plate holder 500 may be separated from the mold frame.

Figure 8:
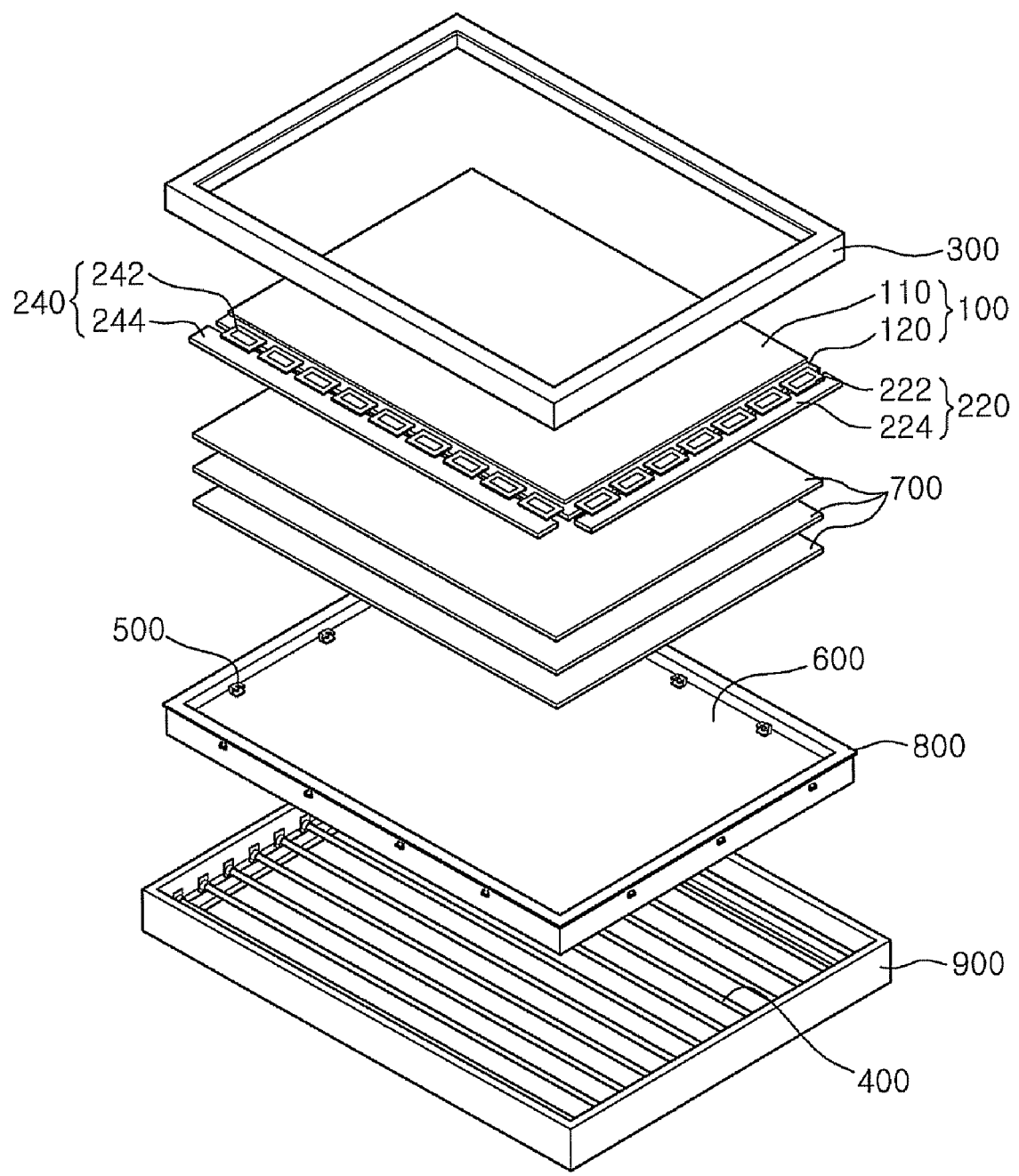
FIG. 8 is an exploded perspective view of an exemplary embodiment of a liquid crystal display including the heat insulation plate holder according to the present invention.

FIG. 8 is an exploded perspective view of an exemplary embodiment of a liquid crystal display including the heat insulation plate holder according to the present invention.

The liquid crystal display may be employed in a public information display ("PID"). Referring to FIG. 8, the liquid crystal display includes an upper receiving container 300, a liquid crystal display panel 100, driving circuit units 220 and 240, the mold frame 800, a plurality of optical sheets 700, a plurality of lamps 400, the heat insulation plate 600, a lower receiving container 900 and a plurality of heat insulation plate holders 500.

The driving circuit units 220 and 240 are connected to the liquid crystal display panel 100 and include a gate side printed circuit board ("PCB") 224 having a control integrated circuit ("IC") mounted thereon and applying a predetermined gate signal to a gate line of a thin film transistor ("TFT") substrate 120, a data side PCB 244 having a control IC mounted thereon and applying a predetermined data signal to a data line of the TFT substrate 120, a flexible gate side PCB 222 for connecting the TFT substrate 120 and the gate side PCB 224, and a flexible data side PCB 242 for connecting the TFT substrate 120 to the data side PCB 244. In addition, a driving IC (not shown) may be mounted on the flexible PCBs 222 and/or 242 to transmit power.

RGB (red, green and blue) signals generated in the PCBs 224 and 244 are transmitted to the liquid crystal display panel 100. In the illustrated exemplary embodiment in FIG. 8, a tape automated bonding ("TAB") type is shown, however, a chip on glass ("CQG") type may be used in which a driving IC is mounted on a TFT substrate rather than the flexible PCBs 222 and/or 242.

The heat insulation plate 600, the plurality of optical sheets 700 and the liquid crystal display panel 100 are sequentially stacked on a floor surface in the receiving space defined in the mold frame 800. The plurality of lamps 400 are disposed in a receiving space of the lower receiving container 900.

The heat insulation plate 600 is disposed between the lamps 400 and the liquid crystal display panel 100, thereby serving to reduce or effectively prevent the heat generated in the lamps 400 from being transmitted to the liquid crystal display panel 100. The heat insulation plate 600 may be made of a light transmitting material in order to allow the light from the lamp to be transmitted to the plurality of optical sheets 700 and the liquid crystal display panel 100.

In the illustrated exemplary embodiments, the plurality of heat insulation plate holders 500 are disposed on the upper surface of the heat insulation plate 600 disposed along and connected to the sidewalls of the mold frame 800, so that a space between the heat insulation plate 600 and the sidewalls of the mold frame 800 is secured to allow for the horizontal expansion of the heat insulation plate 600 while the heat insulation plate 600 is vertically fixed. Advantageously, the heat insulation plate can be prevented from being moved up and down and also bent in a certain direction.

In the illustrated exemplary embodiments, bending of the heat insulation plate is reduced or effectively prevented due to the thermal expansion and from being moved up and down. Advantageously, the heat insulation plate is securely fixed when a shock or vibration is applied to the liquid crystal display.

In addition, since the heat insulation plate holder is easily fastened and separated, it is possible to prevent foreign materials from being generated when the heat insulation plate holder is fastened, to reduce the manufacturing time and improve the re-workability.

The aforementioned embodiments are merely to exemplify the heat insulation plate holder and a liquid crystal display having the same. The present invention is not limited to the embodiments described above. The true scope of the present invention should be defined by the appended claims to the extent that those skilled in the art can make various modifications and changes thereto without departing from the scope of the invention.

What is claimed is:

1. A liquid crystal display comprising:
a liquid crystal display panel displaying images;
a receiving container including a receiving space defined therein;
a lamp providing light to the liquid crystal display panel;
a heat insulation plate disposed in the receiving space and insulating heat generated from the lamp; and
a plurality of heat insulation plate holders, each of the heat insulation plate holders having a first end fixed to the receiving container and a second end disposed on an upper surface of the heat insulation plate and fixing the heat insulation plate,
wherein each of the heat insulation plate holders comprises:
a base portion comprising:
a lower portion including a lower surface facing the heat insulation plate, and an upper surface not facing the heat insulation plate and opposing the lower surface, and
an upper portion including a lower surface which faces the upper surface of the lower portion.

2. The liquid crystal display as claimed in claim 1, wherein each of the insulation plate holders further comprises:
a body portion on an end of the base portion and laterally extending therefrom, and
a head portion at a distal end of the body portion; and
wherein a sidewall of the receiving container includes a plurality of holes and the head portion of the heat insulation plate holder penetrates the hole and is fastened thereto.

3. The liquid crystal display as claimed in claim 1, further comprising: a plurality of optical sheets disposed on the heat insulation plate and a lower receiving container disposed under the receiving container and fastened to the receiving container.

4. The liquid crystal display as claimed in claim 1, wherein each of the heat insulation plate holders is formed of a plastic material.

5. The liquid crystal display as claimed in claim 1, wherein the lower portion of the base portion of the heat insulation plate holder is disposed on the upper surface of the heat insulation plate and preventing the heat insulation plate from being moved up and down.

6. The liquid crystal display as claimed in claim 1,
wherein each of the insulation plate holders further comprises:
a body portion on an end of the base portion and laterally extending therefrom, and
a head portion at a distal end of the body portion; and
wherein the base portion, body portion and head portion of the heat insulation plate holder are integrally formed.

* * * * *